United States Patent [19]
Wentworth

[11] 3,970,605
[45] July 20, 1976

[54] METHOD FOR RECOVERING VINYL SULFONATE MONOMERS

[75] Inventor: Gary Wentworth, Raleigh, N.C.

[73] Assignee: Monsanto Company, St. Louis, Mo.

[22] Filed: Dec. 18, 1974

[21] Appl. No.: 533,899

[52] U.S. Cl. .......................... 260/79.3 M; 210/40; 260/29.6 AN; 260/29.6 SQ; 260/79.5 R; 260/708; 526/68; 526/342

[51] Int. Cl.² .................. B01D 15/00; B01D 53/14; C08F 28/02; C08L 33/20

[58] Field of Search ....... 260/79.5 R, 708, 29.6 AN, 260/29.6 SQ, 79.3 M; 210/40

[56] References Cited
UNITED STATES PATENTS

| | | | |
|---|---|---|---|
| 2,696,304 | 12/1954 | Gilmore | 260/708 |
| 2,696,510 | 12/1954 | Weedman | 260/708 |
| 3,005,826 | 10/1961 | Fleck et al. | 260/708 |
| 3,295,689 | 1/1967 | Avanitakis | 210/40 |
| 3,370,002 | 2/1968 | Cottle | 260/708 |
| 3,547,899 | 12/1970 | Arlt et al. | 260/79.3 MU |

OTHER PUBLICATIONS

Chemical Abstracts, vol. 67, No. 20, 11/13/1967, p. 94, 304 K.
Chemical Abstracts, vol. 72, No. 18, May 4, 1970, p. 93, 624F.
Chemical Abstracts, vol. 73, No. 4, July 27, 1970, p. 16, 616Y.
Chemical Abstracts, vol. 74, No. 14, Apr. 5, 1971, p. 68, 116A.
Chemical Abstracts, 8th Collective Index, 1972, p. 6, 423S

*Primary Examiner*—Ronald W. Griffin
*Attorney, Agent, or Firm*—Robert L. Broad, Jr.

[57] ABSTRACT

Vinyl sulfonate monomers are recovered from an aqueous stream by bringing the stream into contact with activated carbon to allow the carbon to adsorb the monomers from the stream. The sulfonate monomers are subsequently removed from the carbon by bringing an aqueous solution of acrylonitrile into contact with the carbon. The acrylonitrile replaces the sulfonate monomers on the carbon to thereby desorb the sulfonate monomers into the solution in a concentration such that the solution is useful as a feed stream directly to a polymerization reactor. The sulfonate monomers have the formula

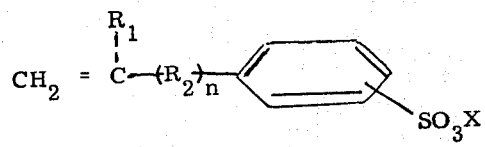

where $R_1$ is —H or —CH₃, $R_2$ is —CH₂O—, —O—, or —CH₂, $n$ is 0 or 1 and X is Na, K or H.

7 Claims, No Drawings

METHOD FOR RECOVERING VINYL SULFONATE MONOMERS

BACKGROUND OF THE INVENTION a. Field of the Invention

This invention relates to methods for recovering vinyl sulfonate monomers.

b. Description of the Prior Art

It is known to copolymerize various mono-olefinic monomers with acrylonitrile in making polymers from which textile filaments are spun. In the conventional process, unreacted monomers are recovered by a distillation process. Unfortunately, such a recovery process is not effective for unreacted monomers of the type

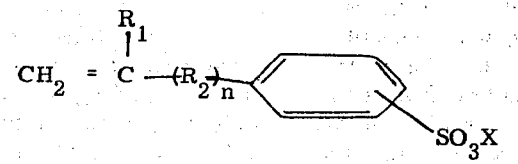

where $R_1$ is —H, —$CH_3$, $R_2$ is —$CH_2O$—, —O— or —$CH_2$—, n is 0 or 1 and X is Na, K or H, for the reason that these monomers are not sufficiently volatile.

Monomers of this type are not usually used as components of textile polymers except in small proportions. Because of the difficulty of recovering the unreacted portion of such monomers and the small amounts of such monomers used, the past practice has been to discard the stream containing these unreacted monomers. The disadvantage of this practice is that these monomers are both expensive and non-biodegradable.

It is known to use carbon adsorption for the purification of water, largely because of the ability of activated carbon to adsorb alkylbenzenesulfonate (ABS) detergents which are present in very low (i.e. parts per million) quantities in most municipal water supplies. However, subsequent recovery of the ABS detergents from the carbon is not practiced.

SUMMARY OF THE INVENTION

The process of this invention is useful for recovering unreacted vinyl sulfonate monomers from slurries produced by the polymerization of acrylonitrile with vinyl sulfonate and other mono-olefinic monomers copolymerizable with acrylonitrile. Prior to treatment by this process the polymerization slurry is filtered to remove polymer solids. Unreacted monomers of a more volatile nature, such as acrylonitrile, vinylidene chloride, etc., are then stripped from the solids-free filtrate, although the order of these two processes may be reversed, i.e., volatile monomers are stripped from the slurry which is then filtered to remove polymer solids. The filtrate, free of volatile monomers and polymer solids, is then treated by the process of the present invention, which comprises passing the filtrate through a bed of activated carbon to remove the sulfonate monomers from the filtrate by adsorption on the carbon and subsequently washing to carbon containing the monomers with an aqueous washing solution containing about 0.1 to 8.0 weight percent acrylonitrile to desorb the sulfonate monomers from the carbon into the washing solution. After desorbing, the acrylonitrile monomer may be stripped from the solution, leaving the solution with a sufficiently high concentration of sulfonate monomers that it can be used as a feed stream directly back to the polymerization reactor. The acrylonitrile remaining on the carbon after the desorbing step can be removed by steam stripping to renew the carbon. The sulfonate monomers recoverable by the process of this invention have the formula

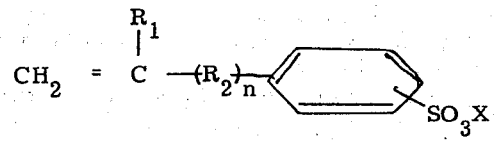

where $R_1$ is —H or —$CH_3$, $R_2$ is —$CH_2O$—, —O— or —$CH_2$—, n is 0 or 1 and X is Na, K or H.

DESCRIPTION OF PREFERRED EMBODIMENTS

This invention provides a process for recovering unreacted monomers of the type

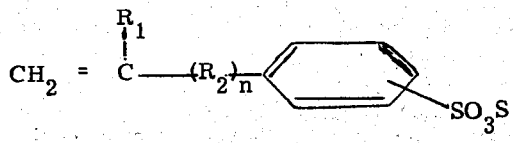

where $R_1$ is —H or —$CH_3$, $R_2$ is —$CH_2O$—, —O—, or —$CH_2$—, n is 0 or 1 and X is Na, K or H, from slurries resulting from the polymerization of acrylonitrile with these and other mono-olefinic monomers.

The polymerization slurry is passed through a filter to remove polymer solids formed during the polymerization and to leave a filtrate containing unreacted sulfonate monomers, as well as small percentages of other unreacted monomers such as vinyl acetate, vinyl chloride, vinylidene chloride and vinyl bromide. Other mono-olefinic monomers copolymerizable with acrylonitrile are well known. Usually, these other unreacted monomers have a volatility such that they, as well as the unreacted acrylonitrile monomer, can easily be stripped from the filtrate.

Either before or after filtration of the slurry, the volatile unreacted monomers, such as acrylonitrile are removed by distillation. This will leave an aqueous solution containing 0.005 to 1.0 weight percent of the unreacted sulfonate monomer. In a typical process the amount is about 0.1 weight percent. The solution will also contain small amounts of inorganic materials such as leftover activator or catalyst or other special additives. In general, these inorganic materials have no effect on the process of the present invention.

The solution is then passed through a first bed of activated carbon which adsorbs the sulfonate monomers from the solution. The contact time between the solution containing the sulfonate monomer or monomers and the activated carbon should be at least 1 minute and is preferably in the range of 2 to 15 minutes. A second bed of carbon, in series with the first, is used to prevent loss of any sulfonate monomer which may pass through the first bed. The inorganic materials pass through the charcoal and are discarded with the stream leaving the carbon. The solution is fed to the carbon until the carbon in the first bed ceases to efficiently adsorb sulfonate monomers. In practice, this point is reached when the weight ratio of carbon to adsorbed sulfonate monomer reaches the range of about 50 to about 3. After this point is reached, solution flow to the carbon is stopped and the steps described below are taken to remove the sulfonate monomers from the first bed of carbon.

During the removal of the sulfonate monomers from the first bed the sulfonate-containing solution is fed directly to the second bed, with a third bed in series with the second bed serving as a backup to adsorb any sulfonate monomers which are not adsorbed by the second bed. The three beds are arranged in such a manner that any two of them may be connected in series while adsorbed sulfonate monomers are being removed from the remaining bed.

The sulfonate monomers are removed from the carbon after adsorption by washing the carbon with aqueous acrylonitrile passed through the bed of carbon. These monomers can also be removed from the carbon by use of aqueous solutions of other organic compounds such as acetone or ethanol, but these agents are not nearly as effective as acrylonitrile. The desorption rate is dependent on the acrylonitrile concentration and increases with acrylonitrile concentration. The amount of acrylonitrile used in the washing solution should be about 0.1 to 8.0 percent, based on solution weight, although it has been demonstrated that inhomogeneous mixtures containing higher proportions of acrylonitrile in water are effective. The inhomogeneous mixture will be made up of an aqueous solution of about 8 percent acrylonitrile mixed with an acrylonitrile phase. The washing solution should be in contact with the carbon for a time period of 1 to 60 minutes, preferably 2 to 15 minutes.

The sulfonate monomer on the carbon is replaced by acrylonitrile during the washing and desorption process. The washing stream leaving the carbon bed will contain 0.5 to 5.0 weight percent of the sulfonate monomer. Preferably, the washing stream leaving the carbon bed will contain at least about 1.5 weight percent of the sulfonate monomers, a concentration which is suitable for feed directly back to the polymerization reactor.

After the sulfonate monomers have been replaced by acrylonitrile in the carbon, steam is passed through the carbon to strip the acrylonitrile therefrom and thereby renew the carbon for again adsorbing sulfonate monomers.

In the following examples the amounts of acrylonitrile were determined by gas chromatography. Sodium p-sulfophenylmethallyl ether (SPME) and potassium vinylbenzenesulfonate (KVBS) were determined by ultraviolet spectroscopy.

EXAMPLE I

A test solution was prepared by dissolving 1.42 g of sodium p-sulfophenylmethallyl ether (SPME) and 4.88 g of sodium sulfate in 600 ml of water to give an SPME concentration (determined by ultraviolet spectroscopy) of 2.43 grams per liter (calculated amount: 2.37 grams/liter). 100 ml portions of this solution each containing 0.3 g of various brands of activated carbon were stirred for 10 minutes. The carbon was then removed and the solutions analyzed by ultraviolet spectroscopy. This analysis revealed the following:

| Activated Carbon Used | SPME Concentration grams/liter |
|---|---|
| None | 2.43 |
| A | 2.00 |
| B | 1.98 |
| C | 1.63 |

EXAMPLE II 300 ml of the test solution described in Example I containing 2.0 g of activated carbon was stirred for 10 minutes. This treatment reduced the SPME concentration from 2.43 g/l to 0.91 g/l; hence, 0.456 g of SPME was adsorbed by the carbon. This carbon was then placed in contact with 100 ml of 1.5 percent aqueous acrylonitrile for 10 minutes. Analysis of this solution after the carbon was removed showed an SPME concentration of 1.13 g/l; hence, 0.113 g of SPME was desorbed from the carbon by the acrylonitrile.

EXAMPLE III 100 ml portions of an aqueous solution of SPME (2.49 g/l) were treated as described in Example I with increasing quantities of activated carbon for 10 minutes. Analysis of the treated solutions shows the effect of quantity of carbon on adsorption efficiency.

| Quantity of carbon, g | SPME concentration, g/l |
|---|---|
| 0 | 2.49 |
| 0.2 | 2.34 |
| 1.0 | 1.86 |
| 2.5 | 0.78 |
| 5.0 | 0.16 |
| 10.0 | 0.01 |

EXAMPLE IV

Several samples of activated carbon containing adsorbed SPME were prepared and then placed in contact with aqueous acrylonitrile of varying concentration for 10 minutes. The percent of SPME thus desorbed was measured.

| % AN in water | % SPME desorbed |
|---|---|
| 1.5 | 31 |
| 2.0 | 36 |
| 2.5 | 46 |
| 4.0 | 59 |

EXAMPLE V

Several samples of activated carbon containing adsorbed SPME were placed in contact with test solutions of organic compounds in water. The percent of SPME thus desorbed was measured.

| Test Solution | % SPME desorbed |
|---|---|
| 7% aqueous acrylonitrile | 70 |
| 7% aqueous acetone | 22 |
| 7% aqueous ethanol | 28 |
| 30% aqueous ethanol | 27 |

EXAMPLE VI 100 ml portions of an aqueous solution of potassium vinylbenzenesulfonate (KVBS) were treated with increasing quantities of activated carbon for 10 minutes. Treated solutions were then analyzed for KVBS by ultraviolet spectroscopy.

| Quantity of carbon g, | KVBS concentration, g/l |
|---|---|
| 0 | 1.05 |
| 0.2 | 0.86 |
| 0.5 | 0.60 |
| 1.0 | 0.33 |
| 2.5 | 0.05 |

EXAMPLE VII

A one inch i.d. column was packed with 32.2 of granular activated carbon (12 mesh). An aqueous solution of SPME (1.01 g/l) was passed upward through the column at a rate of 15.0 cc/min. Effluent from the column was collected and analyzed periodically for SPME.

| Total Effluent volume, ml | SPME concentration, g/l |
|---|---|
| 2475 | 0 |
| 3600 | 0.07 |
| 4050 | 0.17 |
| 4950 | 0.41 |
| 6075 | 0.59 |
| 7200 | 0.70 |

The quantity of SPME on the carbon in the column at the end of the adsorption cycle was calculated to be 6.25 g. Aqueous acrylonitrile (5.2%) was then passed downward through the column at a rate of 15.0 cc/min. Effluent from the column was collected and analyzed periodically for SPME and acrylonitrile.

| Total Effluent volume, ml | Total SPME desorbed, g | Total AN adsorbed, g |
|---|---|---|
| 210 | 1.27 | 5.63 |
| 435 | 4.24 | 10.80 |
| 550 | 5.09 | 14.17 |
| 885 | 5.43 | 15.07 |
| 2010 | 5.72 | 15.1 |
| 2685 | 5.78 | 15.1 |

Thus, 5.78/6.26, or 92 percent of the SPME was desorbed by 15.1 g of AN.

The column was then treated with steam at 8 – 10 psig to remove acrylonitrile from the carbon so that the carbon could again be used for adsorbing sulfonate monomers. Analysis of the distillate from the column showed that AN removal was quantitative.

What is claimed is:

1. A method of recovering from an aqueous process solution sulfonate monomers having the formula

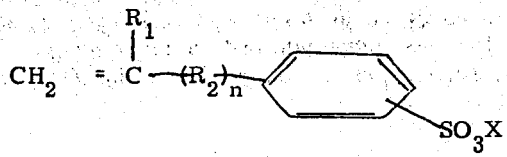

where $R_1$ is —H or —$CH_3$, $R_2$ is —$CH_2O$—, —O—, or —$CH_2$—, $n$ is 0 or 1 and X is Na, K or H comprising
   a. bringing the aqueous process solution into contact with activated carbon to adsorb the sulfonate monomers from said solution into the carbon, said solution being in contact with the carbon for a time period of at least one minute,
   b. removing the carbon from said solution, and
   c. washing the carbon with an aqueous washing solution of 0.1 to 8.0 weight percent acrylonitrile to desorb the sulfonate monomers from the carbon into the washing solution to give a solution concentration of about 0.5 to 5.0 weight percent of said sulfonate monomers.

2. The process of claim 1 wherein the process solution is brought into contact with the carbon by passing said process solution through a bed of activated carbon, the solution being passed through the carbon at such a rate that the solution is in contact with the carbon for a time period of 2 to 15 minutes.

3. The method of claim 2 wherein the aqueous process solution is passed through the carbon bed until the weight ratio of carbon to adsorbed sulfonate monomer lies in the range of about 50 to about 3.

4. The process of claim 2 wherein the washing solution leaving the carbon is treated to strip any residual acrylonitrile monomers therefrom.

5. The method of recovering unreacted sulfonate monomers from slurries produced by the polymerization of acrylonitrile with said sulfonate monomers and other mono-olefinic monomers copolymerizable with acrylonitrile, said sulfonate monomers having the formula

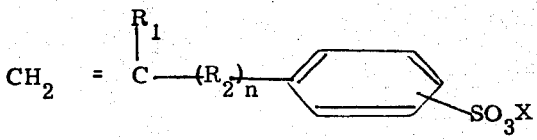

where $R_1$ is —H or —$CH_3$, $R_2$ is —$CH_2O$—, —O—, or —$CH_2$—, $n$ is 0 or 1 and X is Na, K or H comprising
   a. filtering the slurry to remove polymer solids therefrom to leave a filtrate containing about 0.01 to 1.0 weight percent of said sulfonate monomers,
   b. removing said other mono-olefinic monomers from said filtrate, c. passing the filtrate through activated carbon to remove said sulfonate monomers from the filtrate by adsorption by said carbon, and d. washing the carbon with an aqueous washing solution containing about 0.1 to 8.0 weight percent acrylonitrile to desorb said sulfonate monomers from the carbon into said washing solution.

6. The method of claim 5 wherein the filtrate is in contact with the carbon for a time period of 1 to 15 minutes.

7. The method of claim 6 wherein the sulfonate monomer is selected from the group consisting of sodium p-sulfophenylmethallyl ether and potassium vinylbenzenesulfonate.

* * * * *